(12) United States Patent
Taylor et al.

(10) Patent No.: US 10,425,317 B2
(45) Date of Patent: *Sep. 24, 2019

(54) ADAPTIVE DEVICE-INITIATED POLLING

(71) Applicant: PTC Inc., Needham, MA (US)

(72) Inventors: John Louis Taylor, Webster, NY (US); John Thomas Canosa, Spencerport, NY (US)

(73) Assignee: PTC Inc., Boston, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/613,385

(22) Filed: Jun. 5, 2017

(65) Prior Publication Data
US 2017/0366438 A1 Dec. 21, 2017

Related U.S. Application Data

(63) Continuation of application No. 14/921,495, filed on Oct. 23, 2015, now Pat. No. 9,674,067, which is a
(Continued)

(51) Int. Cl.
| | |
|---|---|
| *H04L 12/26* | (2006.01) |
| *G03G 15/00* | (2006.01) |
| *G06F 11/22* | (2006.01) |
| *H04L 29/06* | (2006.01) |
| *H04N 1/00* | (2006.01) |

(Continued)

(52) U.S. Cl.
CPC ....... *H04L 43/103* (2013.01); *G03G 15/5075* (2013.01); *G06F 11/2221* (2013.01); *G06F 11/2294* (2013.01); *G06F 11/26* (2013.01); *G06F 11/3051* (2013.01); *G06F 11/327* (2013.01); *H04L 29/06* (2013.01); *H04L 43/065* (2013.01); *H04L 63/0236* (2013.01); *H04L 67/02* (2013.01); *H04L 67/025* (2013.01); *H04L 67/12* (2013.01); *H04N 1/00344* (2013.01);
(Continued)

(58) Field of Classification Search
CPC ............. G03G 15/5075; G06F 11/2221; G06F 11/2294; G06F 11/26; G06F 11/3051; G06F 11/327; H04L 29/06; H04L 43/065; H04L 43/103; H04L 63/0236; H04L 67/02; H04L 67/025; H04L 67/12; H04L 69/329; H04N 1/00344; H04N 2201/0015; E06B 2003/6638; E06B 3/66319; E06B 3/66342; E06B 3/6715
See application file for complete search history.

(56) References Cited

U.S. PATENT DOCUMENTS

| | | | |
|---|---|---|---|
| 6,546,095 B1 * | 4/2003 | Iverson | H04M 3/42136 379/201.02 |
| 6,782,345 B1 * | 8/2004 | Siegel | G06F 11/0733 399/18 |

(Continued)

*Primary Examiner* — Steven H Nguyen
(74) *Attorney, Agent, or Firm* — Burns & Levinson

(57) ABSTRACT

A method includes periodically sending a polling call to an enterprise system outside the firewall at a first polling rate during normal operating conditions, monitoring for a fault condition, periodically sending polling calls to the device outside the firewall at a second polling rate when a fault condition is detected, the second polling rate being higher than the first polling rate. The second polling rate is used as result of a fault condition. The method also includes sending a problem report with the polling calls when the fault condition is detected.

31 Claims, 4 Drawing Sheets

Related U.S. Application Data continuation of application No. 13/771,338, filed on Feb. 20, 2013, now Pat. No. 9,170,902, which is a continuation of application No. 11/537,399, filed on Sep. 29, 2006, now Pat. No. 8,406,119, which is a continuation-in-part of application No. 10/028,126, filed on Dec. 20, 2001, now Pat. No. 7,254,601.

(51) Int. Cl.
  *G06F 11/26* (2006.01)
  *H04L 29/08* (2006.01)
  *G06F 11/30* (2006.01)
  *G06F 11/32* (2006.01)

(52) U.S. Cl.
  CPC .... *H04L 69/329* (2013.01); *H04N 2201/0015* (2013.01)

(56) References Cited

U.S. PATENT DOCUMENTS

| | | | |
|---|---|---|---|
| 6,894,972 B1 * | 5/2005 | Phaal | H04L 43/022 370/229 |
| 7,185,014 B1 * | 2/2007 | Hansen | G06F 17/30861 |
| 7,254,601 B2 * | 8/2007 | Baller | G03G 15/5075 709/200 |
| 8,406,119 B2 * | 3/2013 | Taylor | G03G 15/5075 370/216 |
| 9,170,902 B2 * | 10/2015 | Taylor | G03G 15/5075 |
| 9,674,067 B2 * | 6/2017 | Taylor | G03G 15/5075 |
| 2003/0139665 A1 * | 7/2003 | Takayama | G16H 40/40 600/407 |

* cited by examiner

ADAPTIVE DEVICE-INITIATED POLLING

This application is a continuation of U.S. application Ser. No. 14/921,495 (to issue as U.S. Pat. No. 9,674,067), which was filed Oct. 23, 2015; U.S. application Ser. No. 14/921,495 is a continuation of U.S. application Ser. No. 13/771,338 (now U.S. Pat. No. 9,170,902), which was filed Feb. 20, 2013; U.S. application Ser. No. 13/771,338 is a continuation of U.S. application Ser. No. 11/537,399 (now U.S. Pat. No. 8,406,119), which was filed Sep. 29, 2006; and U.S. application Ser. No. 11/537,399 is a continuation-in-part of U.S. application Ser. No. 10/028,126 (now U.S. Pat. No. 7,254,601), which was filed Dec. 2001. The disclosures of U.S. applications Ser. Nos. 14/921,495, 13/771,338, 11/537,399, and 10/028,126 are considered part of, and are incorporated by reference into, the disclosure of this application as if set forth herein in full.

BACKGROUND

Field of the Art

The present disclosure generally relates to management of devices having a microprocessor and, more particularly, to management systems including adaptive device-initiated polling.

Background and Relevant Art

Remote connectivity to equipment in the field has become a common practice for many Original Equipment Manufacturers (OEMs). The equipment is frequently distributed over a broad geographical region and often involves hundreds if not thousands or tens of thousands of individual devices. A centralized server system is often used to provide connectivity between the OEMs and the equipment. This connectivity allows the OEM to be much faster in resolving problems with the equipment, in part at least because a centralized server system allows the OEM to manage the devices from one or a few locations rather than at the site of each piece of equipment. Such an approach allows the OEMs to be more proactive in preventing problems or be more proactive in addressing problems before they become serious. Remote connectivity also enables OEMs to provide many new value added services, such as automatic consumables replenishment to their customers.

One very common hurdle that companies wishing to deploy remotely connected devices face is the network infrastructure that is deployed at the customer site. Security measures such as firewalls and Internet proxies as well as common IT infrastructure mechanisms such as Network Address Translation (NAT) represent a barrier for direct connectivity to the equipment. In particular, to provide direct connections between all the equipment and the centralized server system would often be prohibitively expensive. As a result, many approaches have been proposed that involve use of the Internet or other global area networks. One difficulty with such approaches is that security measures frequently block access to on-site devices by external systems.

A common technique for overcoming this barrier is to use device initiated polling. A device performing device-initiated polling typically resides within a firewall. The device sends a polling call to a system that is outside the firewall. An initial polling call often identifies the device and includes any number of parameters from the device, such as consumable levels, operating statistics, or other information. When the external system receives a polling call from the device, the external system services the call and sends a reply back to the device inside the firewall. The reply may include a request that the polling device return additional information back to the polling device during a later polling period. By sending the request from within the firewall, a two-way connection is opened through the firewall between the device inside the firewall and the external system. Frequently, when the external system seeks to initiate contact with the device without first having received a request from the device, the firewall disallows the contact.

Current techniques frequently use a pre-set polling rate that may be changed by a user with appropriate permissions. Users are presented with a challenging decision between bandwidth utilization and responsiveness of the device. If the polling rate is set too low, a user may have to wait up to the entire polling period in order to contact the device to begin performing diagnostics or data capture. If the polling rate is set too high, the device is responsive, but may use too much enterprise system bandwidth adding to the ongoing telecommunications cost of the system and posing scalability problems as the number of devices grows.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method is provided herein that includes periodically sending a polling call to an enterprise system outside the firewall at a first polling rate during normal operating conditions, monitoring for a fault condition, periodically sending polling calls to the device outside the firewall at a second polling rate when a fault condition is detected, the second polling rate being higher than the first polling rate. The second polling rate is the result of a fault condition. The method also includes sending a problem report with the polling calls when the fault condition is detected.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope.

DETAILED DESCRIPTION

The present system and method provides a mechanism for a remotely monitored device to dynamically adjust the rate at which the device initiates a connection to its enterprise based on condition within the device or through device operator assistance. For example, a device may be configured to normally contact an enterprise system once a day. However, if a fault condition is detected within or signaled by the device, the polling rate would automatically be adjusted to an increased rate for an increased period. In addition to increasing the polling rate, the device also sends a problem report to the enterprise system. The enterprise system then notifies a service technician and/or customer service agent that a fault condition has occurred and that the device is requesting service. As a result, the service technician provides rapid notification that the device has encountered a fault condition, rather than having to wait until the end of the polling period. This rapid notification is provided while minimizing the bandwidth used by the device to communicate with the enterprise system during periods when the device is not encountering a fault condition.

Additionally, when the service technician begins to diagnose and address the fault condition, the device is polling at increased rate. The increased polling rate allows the technician to receive quicker responses from the device. Specifically, the length of each polling period is decreased with an increased polling rate because the device sends polling calls more frequently. As a result, the time the service technician waits for responses from the device between polling periods is decreased with an increased polling rate. Thus, the system is also more responsive when the service technician is working to address the fault condition.

Further, the enterprise system may be configured to respond to the problem report. For example, the enterprise system may include a server or servers that receives the problem report and automatically responds to the device with instructions to the device, such as instructions to diagnose and/or remedy the fault condition.

Figure 1:
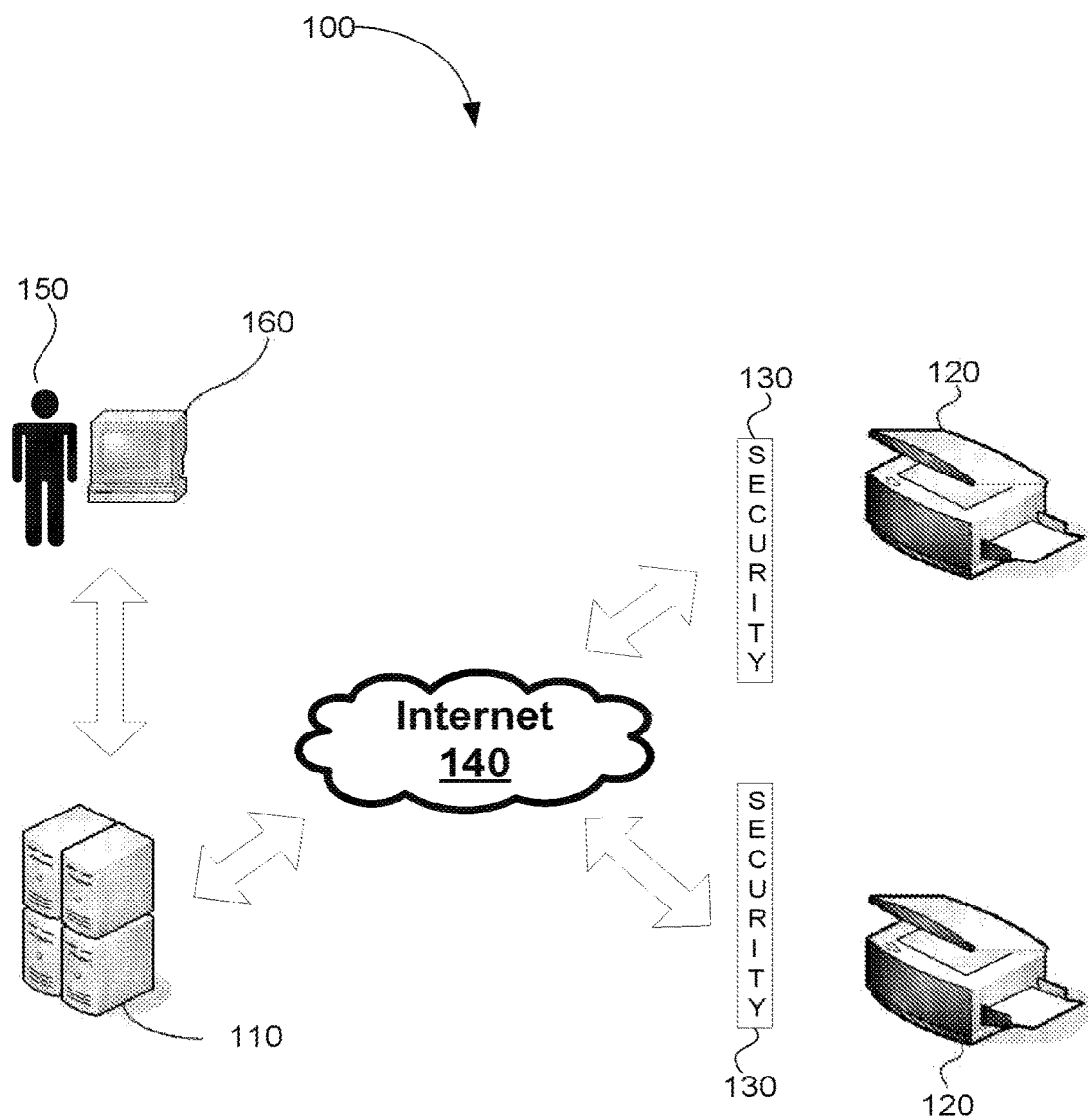
FIG. 1 illustrates a system having distributed assets able to perform adaptive device initiated polling according to one example.

FIG. 1 illustrates a schematic view of a system 100 that includes an enterprise system 110 that is used to manage a number of devices 120 using a network, such as the Internet or a global computer network. The devices 120 each include a microprocessor based system that autonomously and regularly initiates a connection to poll the enterprise system 110. The enterprise system 110 is a centrally located remote enterprise system that is responsible for monitoring and managing the device. This polling mechanism allows the device to query the enterprise system from behind typical intranet security measures 130. The intranet security measures may include firewalls, Internet proxies and Network Address Translators (NATs). A typical polling process will now be discussed in more detail.

The devices 120 may include any number of devices that have a microprocessor. Examples of some devices include, without limitation, copiers, printers, fax machines, and other office machines, machine tools, hospital equipment, or any other device that includes a microprocessor. The microprocessor in each device 120 monitors any number of parameters, such as parameters relating the operation of the device. In the case of office equipment, these parameters may include the current level of consumables or any other condition. Further, the parameters may include information that may be relevant to the manufacturer or customer service provider. In short, any number of desired parameters may be monitored and tracked by the device 120. These parameters may then be logged for communication to the enterprise system 120.

A device 120 automatically and autonomously initiates a polling call at the end of a polling period during normal operating conditions. The polling period during normal operating conditions may be set as desired and may vary from device to device. Examples of polling periods include, without limitation, an hour, several hours, a day, several days, a week, or any other period of time. At the end of each polling period, the device 120 sends a polling call to the enterprise system 110 over an external network, such as the Internet 140 or global computer network. The polling call includes all of the parameters tracked during the polling period. The polling call also includes a request for the enterprise system 110 to return data relevant to the device 120. The device 120 opens a portal through the security measures by sending the polling call to the Internet 140.

The enterprise system 110 receives the polling call from the Internet 140. The enterprise system 110 then stores the parameters and other information sent with the polling call and fulfills any requests included with the polling call.

The enterprise system 110 then formulates a response to the polling call. The response includes any commands, actions, and requests to the device that have been queued up since the last time the device 120 polled the enterprise system 110.

The enterprise system 110 sends the response over the Internet 140 to the device 120 through the security measures 130. The security measures 130 allow the response to pass to the device 120 because the polling call previously sent opened the portal between the device 120 and the enterprise system 110. The device 120 receives the call and processes the information as necessary. The device 120 then again monitors parameters during normal periods of operation and again polls at the end of the normal polling period.

The device 120 is also configured to monitor for fault conditions. Each device 120 may be configured to store one or more threshold value associated with one or more parameter. When one or more threshold values are surpassed, a fault condition exists within the device 120. The device 120 may autonomously initiate an increased polling rate through adaptive device-initiated polling as will be discussed in more detail below.

It may be desirable for the enterprise system 110 to also notify a service technician 150 or customer service agent of the fault condition. The service technician 150 may then use a local computer 160 to access the device 120 via the enterprise system 110. Such a configuration may allow the service technician to diagnose and address the fault condition quickly. Specifically, the length of each polling period is decreased with an increased polling rate because the device sends polling calls more frequently. As a result, the time the service technician waits for responses from the device between polling periods is decreased with an increased polling rate.

Figure 2:
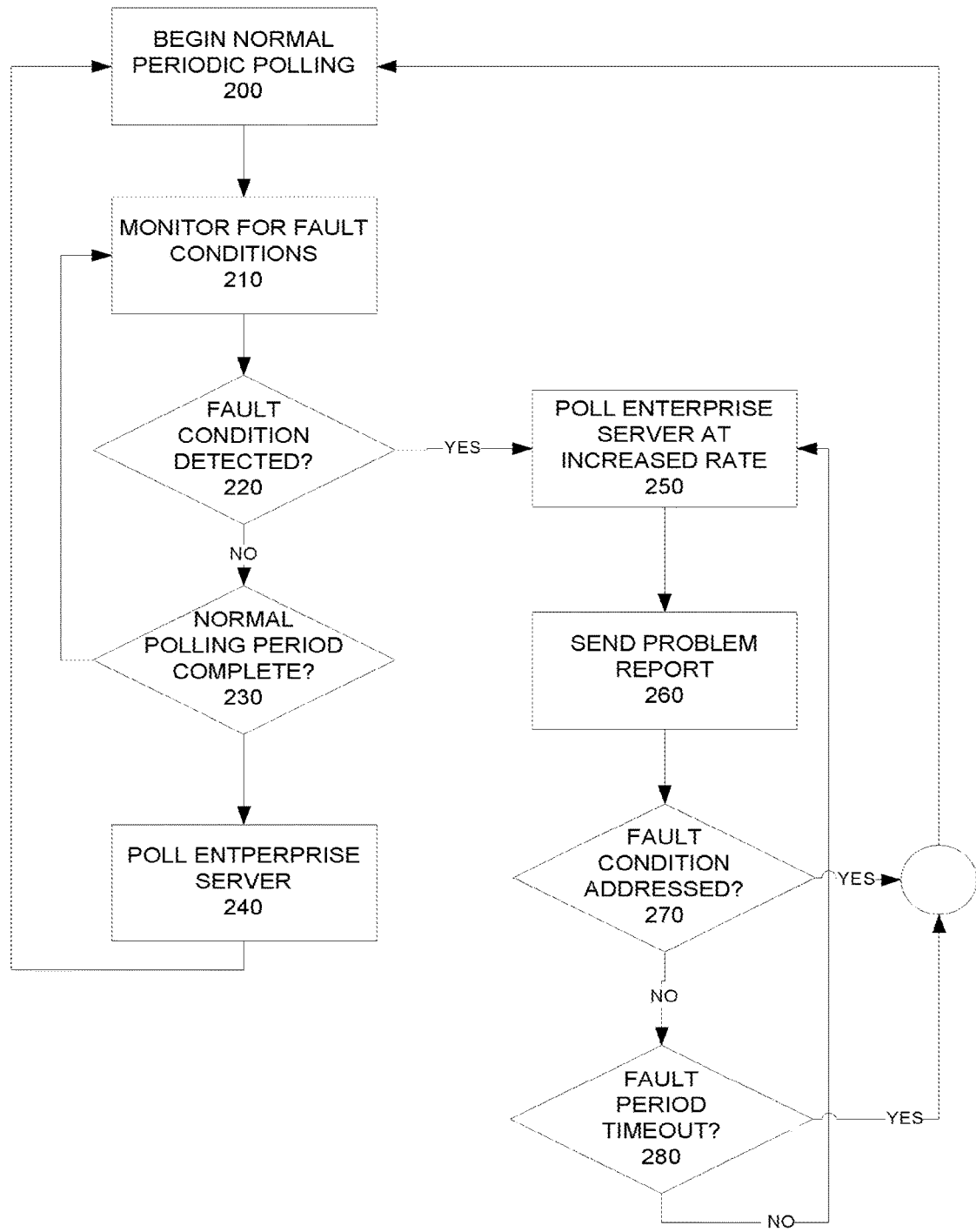
FIG. 2 is a flowchart illustrating a method of performing adaptive device initiated polling according to one example.

FIG. 2 is a flowchart illustrating a process for adaptive device-initiated polling from the perspective of a device. Adaptive device-initiated polling includes normal periodic polling, which begins at 200. Normal periodic polling may include gathering device operating parameters, requests, or any other information to be transmitted with the next polling call.

As depicted at 210 adaptive device-initiated polling also includes monitoring for fault conditions. The device monitors for fault conditions by sensing any number of parameters and then comparing the parameters to any threshold values that may be stored on the device related to the parameters. Not all of the parameters have threshold values. Further, of the parameters that have threshold values, those threshold values may or may not be compared within the device. Those of ordinary skill in the art will appreciate that the comparison of a monitored parameter value to a threshold parameter value may also be performed by the enterprise system.

At 220, the device determines whether a fault condition has occurred. If a fault condition has not been detected (No, 220), at 230 the device then determines whether the normal polling period is complete. If the normal polling period is not complete (No, 230), the device continues to monitor for fault conditions at 220 until the normal polling period is complete. Once the normal polling period is complete, (YES, 230), at 240 the device initiates a polling call to an external enterprise system and the normal periodic polling process begins again.

The normal periodic polling will generally continue so long as no fault condition is detected (No, 220). However, once a fault condition is detected (Yes, 220), at 250 the device then begins to poll the enterprise system at an increased rate relative to the normal periodic polling rate. Any number of fault conditions may be detected that include sensing any number of parameters or actions.

To this point detecting a monitored parameter value that surpasses a corresponding threshold parameter has been discussed as the trigger for a fault condition. In addition, other conditions may trigger a fault condition. For example, if an end user of the device encounters an unexpected problem, the user may be able to externally instigate a fault condition. In particular, the user may indicate through the operator interface of the device that the user needs assistance from the manufacturer's customer support organization. The manual initiation of a service request would then result in the polling rate increase and notification described above. According, receiving a manual request from a user can be considered as detecting a fault condition.

In addition, other external sources may be used to trigger a fault condition. Specifically, a device may be connected to a telephone line, such as through a modem. The device may be configured to poll periodically. A service technician from the device's manufacturer may desire to query the device for some specific parameters without waiting until the end of the polling period for the device to poll the enterprise and receive the request. The device could be configured to adjust its polling rate in response to detecting the telephone ringing to minimize delay. As such, one fault condition may include detecting a telephone ringing with or without answering the call. Once the fault condition is detected, the device may begin polling the enterprise server at an increased rate, such as by using the telephone line to dial out to the enterprise server for a predetermined period.

In addition to polling the enterprise server at an increased rate, at 260 the device also sends a problem report to the enterprise server. The problem report provides notification to the enterprise system that a fault condition has occurred. The problem report may include the actual condition that caused the change in the polling rate. The problem report may also include a screen capture of a visual image of the device's user interface screens at the time of the default condition. Further, the problem report may include information about when and how the fault condition occurred. Such information may allow a technician or other person or machine rendering service to quickly determine which measures to use to remedy the fault condition. By increasing the polling rate and sending a problem report that includes a request for service, a technician is notified of the fault and will be able to perform diagnostics on a device that is polling at a much more responsive rate than the rate used under normal conditions. The increased polling rate may allow the technician to more quickly diagnose and correct the fault condition as the delay between each polling call is decreased.

While increasing the polling rate and sending a problem report are illustrated as separate steps, those of ordinary skill in the art will appreciate that the two steps may occur simultaneously or be part of a single step. When the polling rate is increased, the device begins to log how long the polling rate has been increased. The increased polling period may have a time out period after which the polling rate will be returned to the normal periodic polling rate, as will be discussed below.

Once the device has increased the polling rate and sent the problem report, at 270 the device then determines whether the fault condition has been addressed. The fault condition may be addressed by receiving information back from the enterprise server, such as instructions provided to the enterprise system by a service technician. Additionally, the enterprise system itself may generate instructions to diagnose and correct the fault condition. If the device receives instructions and the instructions correct the fault condition (Yes, 270), the device stops polling at the increased polling rate and again begins periodic polling at 200. Other factors may remedy the fault condition. For example, it may be possible that the device is able to correct the fault condition or that a user on-site at the device's location is able to fix the fault condition. In any case, if the fault condition is addressed, the device returns to normal periodic polling.

If the fault condition is not addressed, at 280 the device then determines whether the fault period has timed out. If the fault period has timed out (Yes, 280), the device may then begin a new normal periodic polling period at 200. Alternatively, when the fault period has timed out (Yes, 280) the device may instead resume a normal periodic polling process midstream, which would poll the enterprise system at the end of the polling period underway when the fault condition was detected.

If the fault period has not timed out (No, 280), the device continues to poll at the increased rate at 250 and to send problem reports at 260 until either the fault condition is addressed at 270 or the fault period times out at 280. Accordingly, the present method provides for relatively low polling rates during periods of inactivity to thus reduce the amount of bandwidth utilizes. The present method also provides for increasing the polling rate of the device when a fault condition is detected. Fault conditions may include detecting that a monitored parameter value has surpassed a threshold parameter value, that a fault action has occurred such as detecting a telephone ringing or receiving an external command to increase a polling rate for a desired duration. Further, the present method allows the device to send a problem report and service request to a technician or other customer service representative. By notifying the technician when the fault condition is detected, the technician may be able to respond quickly to the fault condition. When the technician responds, the device is already polling at an increased rate, thereby reducing the wait time the technician experiences associated with each polling period.

Figure 3:
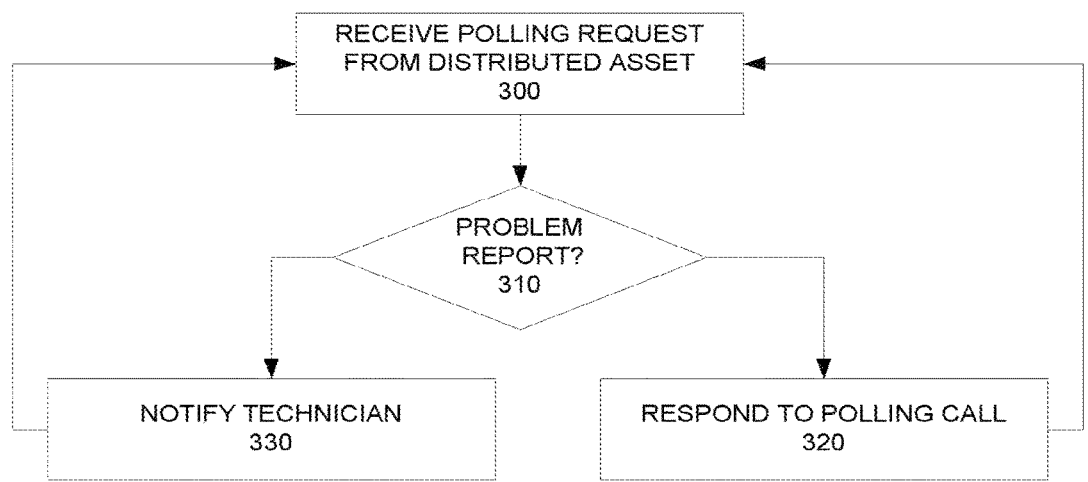
FIG. 3 is a flowchart illustrating a method of managing distributed devices according to one example.
Figure 4:
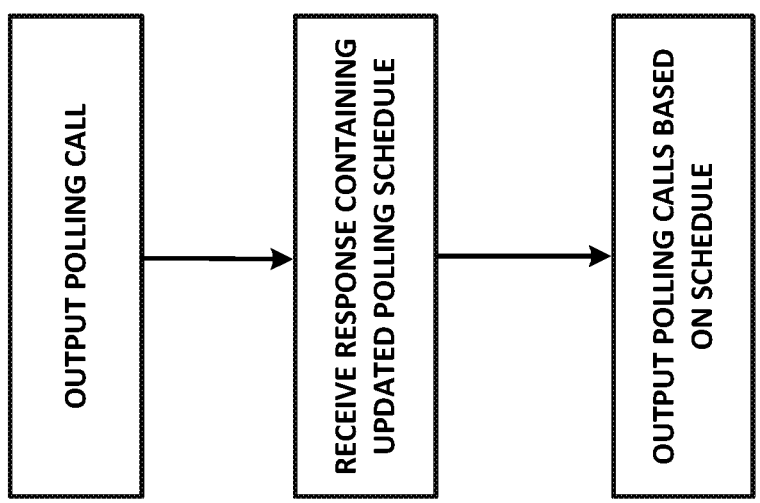
FIG. 4 is a flowchart illustrating a method performed by an asset of changing a polling schedule.

FIG. 3 is a flowchart illustrating a method of managing distributed assets according to one example as seen from the point of view of the enterprise system. The method begins at 300 when the enterprise system receives a polling call from a device. The enterprise system 300 at 310 then determines whether the polling call includes a problem report. If the polling call does not include a problem report (No, 310), the enterprise system at 320 responds to the polling call by returning any commands, actions, and/or requests to the device that have been queued up since the last time the device polled the enterprise system.

If the polling call does include a problem report (Yes, 310), the enterprise system at 330 notifies a service technician and/or customer service agent that a fault condition has been report and the device has requested service. At 340, the enterprise system then receives instructions from the technician and/or customer service, which the enterprise system then includes in responses to the polling calls. The enterprise system itself may be configured to generate instructions to the device in response to receive a problem report. In such an example, the enterprise system would analyze the problem report and automatically respond to the device with instructions to the device, such as instructions to diagnose and/or remedy the fault condition.

In addition, the enterprise system may also be configured to compare monitored parameter information to threshold information to generate a problem report. In such a case, the device would then receive notification that a fault condition existed which would trigger the increased polling rate previously discussed.

In conclusion, a system and method have been discussed herein that provide a mechanism for a remotely monitored device to dynamically adjust the rate at which the device initiates a connection to its enterprise based on condition within the device or through device operator assistance. For example, a device may be configured to normally contact an enterprise system once an hour. However, if a fault condition is detected within or signaled by the device, the polling rate would automatically be adjusted to an increased rate for an increased period. In addition to increasing the polling rate, the device also sends a problem report to the enterprise system. The enterprise system then notifies a service technician and/or customer service agent that a fault condition has occurred and that the device is requesting service.

An optimization to the polling server adds the ability to speed up the polling interval due to situational conditions. Consider the following use case relating to remote diagnostics: (a) Asset submits problem report (b) Technician is notified of the problem (c) Technician contacts the asset and performs remote diagnostics (either by querying asset properties, such as temperature and airflow, or by instructing the asset to execute internal diagnostics routines).

For example, an asset may be setup with a polling interval of once per day. If a problem is reported in the middle of the day and the technician desires to run a diagnostic test, the diagnostic command would wait in the polling queue until the end of the day when the asset polls again. Instead, this invention adapts the polling interval based on the situation.

In this example, the fault notification causes the polling interval to shorten, perhaps to once per minute for 60 minutes. This allows the technician to have near real-time response to diagnostic requests for the expected duration of the diagnostic session.

The polling schedule change can be statically defined in the schedule for the asset (e.g. once per day; once per minute for 60 minutes upon fault) or dynamically changed based on the enterprise response (e.g. the fault message generates a reply from the enterprise server which contains an updated polling schedule such as once per minute for 20 minutes). Note that a possible scenario is that the polling server is inactive until a situation requires polling (a trade-off for operational costs).

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system comprising:
an electronic device; and
a processor to perform operations comprising:
monitoring operation of the electronic device;
detecting an operational condition of the electronic device based on the monitoring;
generating a polling call based on the operational condition;
sending the polling call over a computer network to a server;

receiving a polling schedule from the server in response to the polling call; and polling the server based on the polling schedule for content relating to the electronic device;

wherein the electronic device and the processor are behind network security, the server is not behind the network security, and the polling call opens a window through the network security that enables the content to pass from the server to the processor.

2. The system of claim 1, wherein the operational condition comprises a fault, the polling call comprises a fault message, and the content comprises a diagnostic command for initiating a diagnostic test of the electronic device.

3. The system of claim 1, wherein the operations comprise polling the server at a first rate prior to detecting the operational condition; and wherein polling based on the polling schedule is performed at a second rate, the second rate being greater than the first rate.

4. The system of claim 1, wherein the operational condition comprises a fault in the electronic device; and wherein polling based on the polling schedule is performed until the fault is corrected.

5. The system of claim 4, wherein, following correction of the fault, polling is performed at a rate that is less than a rate specified in the polling schedule.

6. The system of claim 4, wherein, following correction of the fault, polling ceases.

7. The system of claim 1, wherein the operations comprise receiving the content from the server; and wherein the processor is embedded in the electronic device.

8. The system of claim 7, wherein the network security comprises at least one of a firewall, an Internet proxy, or a Network Address Translator (NAT).

9. The system of claim 1, wherein the operations comprise sending a report to the server, the report containing information about the operational condition of the electronic device.

10. The system of claim 1, wherein polling the server comprises outputting polling calls to the server; and wherein the operations comprise outputting, to the server, one or more parameters of the electronic device that are based on monitoring operation of the electronic device.

11. A system comprising:
non-transitory machine-readable memory storing instructions that are executable; and
a processor to execute the instructions to perform operations comprising:
  receiving a polling call from an embedded processor, the polling call being based on an operational condition of an electronic device monitored by the embedded processor;
  outputting a polling schedule to the embedded processor based on the polling call;
  receiving polling calls from the embedded processor at a rate specified in the polling schedule; and
  outputting content to the embedded processor in response to the polling calls;
wherein the embedded processor is behind network security, the system is not behind the network security, and the polling call opens a window through the network security that enables the content to pass from the system to the embedded processor.

12. The system of claim 11, wherein the operational condition comprises a fault, the polling call comprises a fault message, and the content comprises a diagnostic command for initiating a diagnostic test of the electronic device.

13. The system of claim 11, wherein the operations comprise receiving polling calls at a first rate prior to receiving the polling call; and wherein the polling calls received at the rate specified in the polling schedule are at a second rate, the second rate being greater than the first rate.

14. The system of claim 13, wherein the operational condition comprises a fault in the electronic device; and wherein the polling calls are received at the second rate until the fault is corrected.

15. The system of claim 14, wherein, following correction of the fault, polling calls are received at the first rate.

16. The system of claim 14, wherein the operational condition comprises a fault in the electronic device; and wherein, following correction of the fault, no polling calls are received by the processor from the embedded processor.

17. The system of claim 11, wherein the network security comprises at least one of a firewall, an Internet proxy, or a Network Address Translator (NAT).

18. The system of claim 11, wherein the operations comprise receiving a report from the embedded processor, the report containing information about the operational condition of the electronic device.

19. The system of claim 11, wherein the operations comprise receiving, from the embedded processor, one or more parameters of the electronic device that are based on monitoring operation of the electronic device.

20. Non-transitory machine-readable memory storing instructions that are executable by a processor to perform operations comprising:
  monitoring operation of an electronic device;
  detecting an operational condition of the electronic device based on the monitoring;
  generating a polling call based on the operational condition;
  sending the polling call over a computer network to a server;
  receiving a polling schedule from the server in response to the polling call; and
  polling the server based on the polling schedule for content relating to the electronic device;
wherein the electronic device and the processor are behind network security, the server is not behind the network security, and the polling call opens a window through the network security that enables the content to pass from the server to the processor.

21. The non-transitory machine-readable memory of claim 20, wherein the operational condition comprises a fault, the polling call comprises a fault message, and the content comprises a diagnostic command for initiating a diagnostic test of the electronic device.

22. The non-transitory machine-readable memory of claim 20, wherein the operations comprise polling the server at a first rate prior to detecting the operational condition; and wherein polling based on the polling schedule is performed at a second rate, the second rate being greater than the first rate.

23. Non-transitory machine-readable memory storing instructions that are executable by a system to perform operations comprising:
  receiving a polling call from an embedded processor, the polling call being based on an operational condition of an electronic device monitored by the embedded processor;

outputting a polling schedule to the embedded processor based on the message;
receiving polling calls from the embedded processor at a rate specified in the polling schedule; and
outputting content to the embedded processor in response to the polling calls;
wherein the embedded processor is behind network security, the system is not behind the network security, and the polling call opens a window through the network security that enables the content to pass from the system to the embedded processor.

24. The non-transitory machine-readable memory of claim 23, wherein the operational condition comprises a fault, the polling call comprises a fault message, and the content comprises a diagnostic command for initiating a diagnostic test of the electronic device.

25. The non-transitory machine-readable memory of claim 23, wherein the operations comprise receiving polling calls at a first rate prior to receiving the polling call; and
wherein the polling calls received at the rate specified in the polling schedule are at a second rate, the second rate being greater than the first rate.

26. A method performed by a processor, comprising:
monitoring operation of an electronic device;
detecting an operational condition of the electronic device based on the monitoring;
generating a polling call based on the operational condition;
sending the polling call over a computer network to a server;
receiving a polling schedule from the server in response to the polling call; and
polling the server based on the polling schedule for content relating to the electronic device;
wherein the electronic device and the processor are behind network security, the server is not behind the network security, and the polling call opens a window through the network security that enables the content to pass from the server to the processor.

27. The method of claim 26, wherein the operational condition comprises a fault, the polling call comprises a fault message, and the content comprises a diagnostic command for initiating a diagnostic test of the electronic device.

28. The method of claim 26, wherein the method further comprises polling the server at a first rate prior to detecting the operational condition; and
wherein polling based on the polling schedule is performed at a second rate, the second rate being greater than the first rate.

29. A method performed by a system, comprising:
receiving a polling call from an embedded processor, the polling call being based on an operational condition of an electronic device monitored by the embedded processor;
outputting a polling schedule to the embedded processor based on the message;
receiving polling calls from the embedded processor at a rate specified in the polling schedule; and
outputting content to the embedded processor in response to the polling calls;
wherein the embedded processor is behind network security, the system is not behind the network security, and the polling call opens a window through the network security that enables the content to pass from the system to the embedded processor.

30. The method of claim 29, wherein the operational condition comprises a fault, the polling call comprises a fault message, and the content comprises a diagnostic command for initiating a diagnostic test of the electronic device.

31. The method of claim 29, wherein the method further comprises receiving polling calls at a first rate prior to receiving the polling call; and
wherein the polling calls received at the rate specified in the polling schedule are at a second rate, the second rate being greater than the first rate.

* * * * *